United States Patent [19]

Grimm et al.

[11] Patent Number: 5,658,386
[45] Date of Patent: Aug. 19, 1997

[54] DEVICE FOR COATING ROTATING BODIES

[75] Inventors: Wolfgang Grimm, Leverkusen; Jürgen Giesselmann, Overath, both of Germany

[73] Assignee: Bayer Aktiengesellschaft, Leverkusen, Germany

[21] Appl. No.: 538,710

[22] Filed: Oct. 3, 1995

[30] Foreign Application Priority Data

Oct. 13, 1994 [DE] Germany .................. 44 36 534.9

[51] Int. Cl.$^6$ ............................................. B05B 13/04
[52] U.S. Cl. ........................... 118/320; 118/319; 118/321; 134/172
[58] Field of Search ................. 118/320, 319, 118/321, 323; 134/172, 180; 413/69, 77, 18

[56] References Cited

FOREIGN PATENT DOCUMENTS

| 3828427 | 3/1990 | Germany . |
| 2109891 | 6/1983 | United Kingdom . |

*Primary Examiner*—Donald E. Czaja
*Assistant Examiner*—Calvin Padgett
*Attorney, Agent, or Firm*—Joseph C. Gil; Noland J. Cheung

[57] ABSTRACT

A device is described for externally coating bodies of revolution which comprises means for mounting and rotatably driving the body to be coated, at least one coating compound application nozzle which is stationary relative to the rotational movement of the body, and drive means for the relative movement of the nozzle and body of revolution in the axial direction of the body. The nozzle is secured on the horizontal leg of an elbow disposed transversely to the nozzle axis, wherein the elbow is guided towards a restoring device in a horizontally displaceable manner by means of a vertically movable horizontal support arm. In operation the horizontal leg and support arm rest on the body of revolution and the other leg of the elbow laterally abutting the body.

4 Claims, 3 Drawing Sheets

DEVICE FOR COATING ROTATING BODIES

BACKGROUND OF THE INVENTION

When coating tubes and rollers of steel, for example, with plastic materials it is known to apply the plastic material in liquid form to the rotating body, the body of revolution and application device being moved in linear manner such that the coating compound surrounds the body of revolution in the form of an overlapping helix.

When relatively long tubes are coated, problems arise since the tube axis may not be completely strictly linear and may contain deflections. Because of these deflections, the tube rotates under a rigidly mounted coating compound application device and moves transversely which leads to an irregular application of the coating compound.

It is the object of the present invention to provide a device in the case of which the application device is disposed so as to be movable transversely to the tube axis such that the application device is continually adjusted in relation to the central point of the peripheral line of the tube, which line is associated with the application device, such that it is ensured that the application of the coating agent to the tube is uniform even if the central point of the tube cross-section rotates about the axis of rotation of the tube at the point of application.

DESCRIPTION OF THE INVENTION

Figure 1:
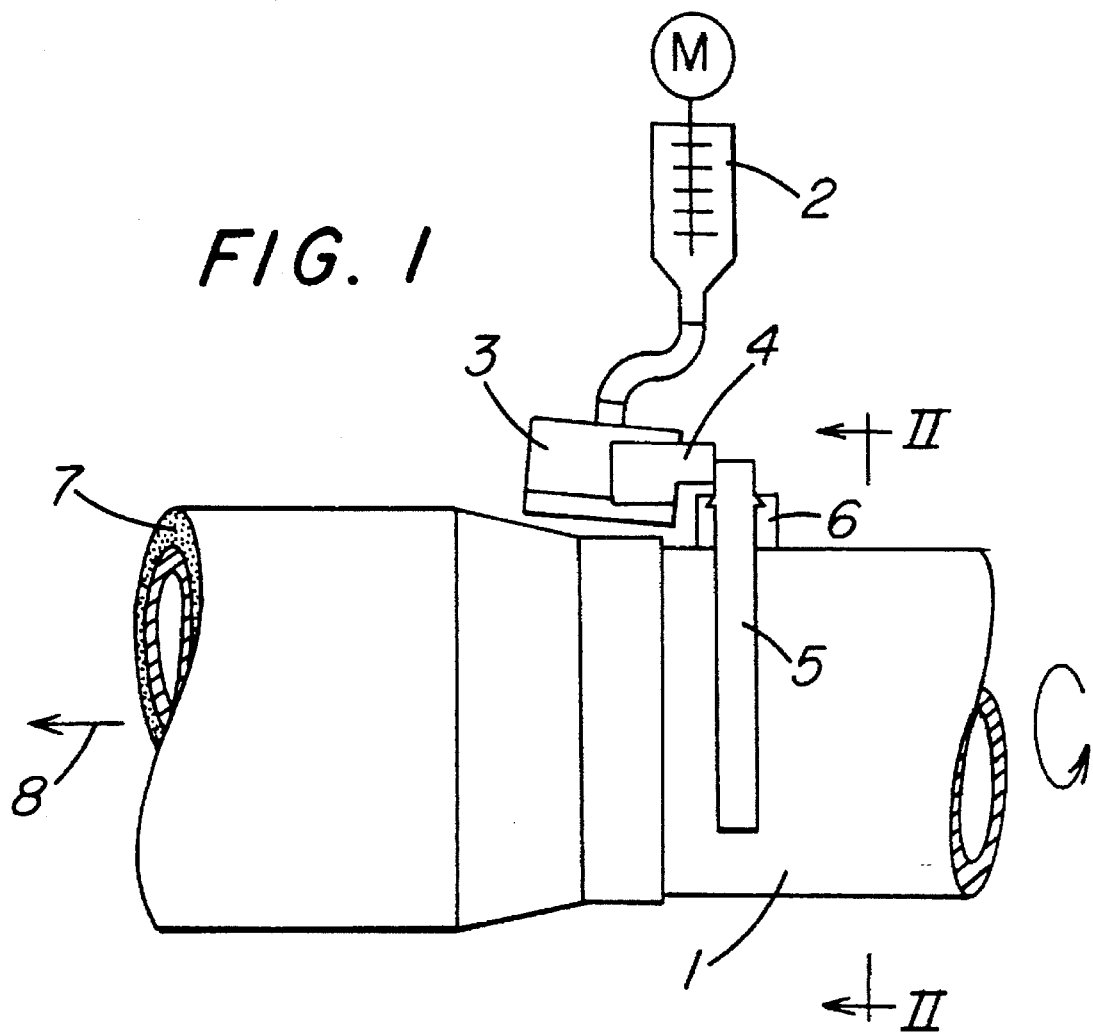
FIG. 1 shows a side view of the essential aspect of the present invention.

The present invention is directed to a device for externally coating rotating comprising:

a) means for mounting and rotatably driving the body to be coated, with the body preferably being a tube or pipe;

b) at least one coating compound application nozzle which is stationary relative to the rotational movement of said body;

c) drive means for the relative movement of the nozzle and the body in the axial direction of the body;

d) with the nozzle being secured to an elbow, said elbow comprising a horizontal leg and a vertical leg perpendicular thereto, and wherein said nozzle is secured to said horizontal leg;

e) said horizontal leg being horizontally displaceable and being mounted on a vertically movable horizontal support arm and wherein the horizontal displacement of said horizontal leg is caused by a restoring device; and wherein, in operation, said support arm rests on said body and said vertical leg laterally abuts said body.

The means for mounting and rotatably driving the body can be of substantially any known type. For example, the body can be speared at both ends on a mandrel, at least one of the mandrels being drivable in rotation and the other mandrel being rotatably mounted. Corresponding means are available to the person skilled in the art.

The delivery nozzle for the coating compound is formed according to the type of coating compound. If the coating compound consists of a thermoplastic polymer, the application nozzle is generally in the form of an extruder. The coating compound is then applied to the body of revolution at a higher temperature at which said compound is liquid and sets on said body. Preferably a two-component reactive coating compound, in particular polyurethane, is used as coating compound. In this case the application device comprises a mixing chamber for the two reactive components (in the case of polyurethane, isocyanate and polyol), with the mixing chamber outlet being in the form of an application nozzle. Preferably a slit-shaped nozzle is used, the slit being disposed in a plane containing the axis of the body of revolution and obliquely to the axis so that the application occurs in overlapping manner over a plurality of revolutions of the tube. In this respect it is particularly preferable if the nozzle is not disposed exactly above the body but is slightly offset laterally counter to the sense of rotation of the body. A particularly preferred relative arrangement of the slit-die nozzle and rotating tube is disclosed in the German published application 4,325,653.

The means for the relative movement of nozzle and body of revolution in the axial direction can likewise be of any known type. For example, the nozzle can be moved along the body or the body moved along below the stationary nozzle.

The element, which is essential to the invention is the mounting for the application nozzle, and comprises a support arm and elbow. The support arm can comprise a pivotably mounted lever which is mounted on one side via a shaft in a plane so that it can pivot transversely to the axis of the body of revolution and rests with its other side on the body. The vertical movability of the support arm thus results from the pivotability. Preferably the length of the support arm should be at least twice the diameter of the body of revolution, preferably at least three times the diameter. Preferably the support arm is in the form of a parallelogram so that the elbow maintains its directional orientation as the support arm pivots.

The lengths of the legs of the elbow, on the one leg of which the application nozzle is secured, preferably correspond to 1.1 to 2 times the tube radius. The horizontal leg is displaceably connected to the support arm by a dove-tailed or ball-type guide. The restoring device, towards which the elbow can be displaced against the support arm, can comprise a restoring spring or a hydraulic or pneumatic restoring device. The restoring device ensures that the other leg of the elbow abuts the tube and also performs every movement of the tube due to the restoring force of the restoring device.

Figure 2:
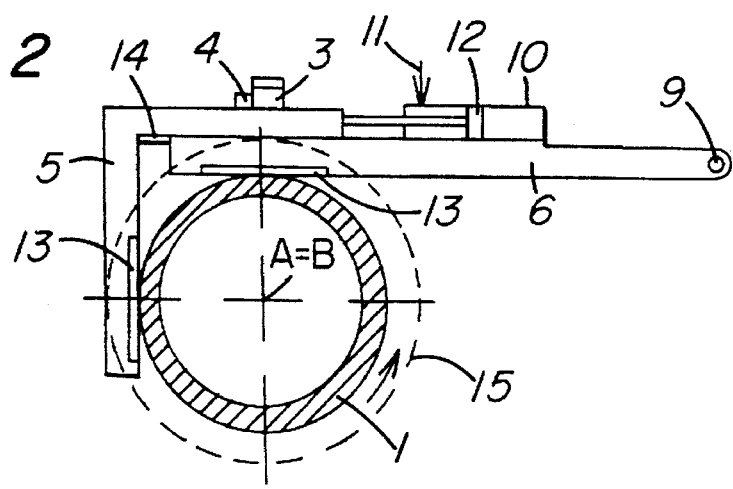
FIGS. 2, 3 and 4 show sections A—A through the device of FIG. 1.
Figure 3:
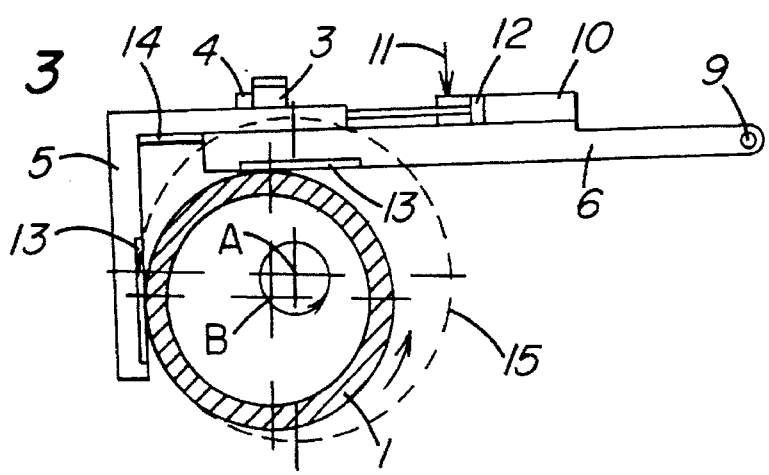
Figure 4:
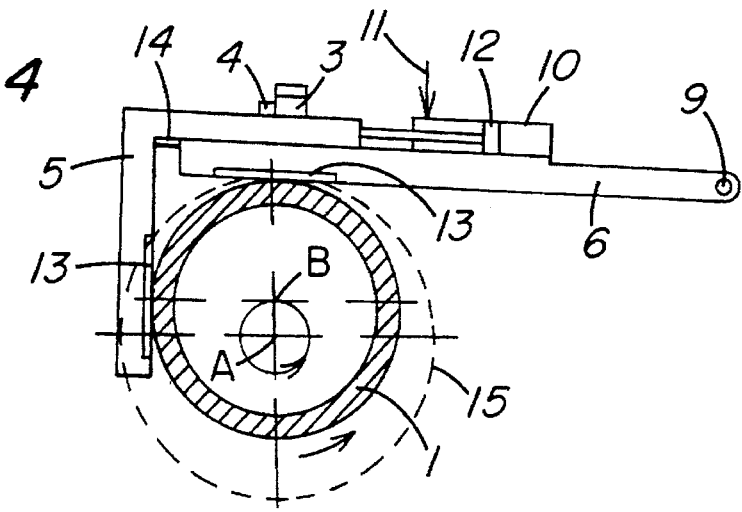

The invention will now be described in further detail with reference to the Drawings. The Figures show the tube 1 which is driven in rotation and is to be coated and above which a mixing head 2 with a discharge nozzle 3 is disposed. Via a mounting 4, which enables the setting angle of the nozzle 3 to be adjusted for example, the nozzle 3 is connected to the elbow 5 which is disposed on the support arm 6 so as to be displaceable via a dove-tailed guide 14. The left hand part of the tube 1 in FIG. 1 has already been provided with the coating 7. The tube is moved according to the arrow 8 towards the mixing head during the course of the coating process. As FIGS. 2 to 4 show, the support arm 6 is pivotably mounted by means of a shaft 9, which shaft 9 is mounted on some stationary element, e.g. frame work of building or installation. A hydraulic restoring device 10 is further provided which, as indicated by the arrow 11, is acted upon by a pressurized fluid such that the piston 12 is moved in the hydraulic device in the direction of the shaft 9 of the support arm as soon as the perpendicular leg of the elbow 5 does not abut the tube 1. The abutment surfaces 13 of the support 6 and of the elbow 5 on the tube can further be provided with sliding surfaces, e.g. wooden slats or rollers. The circle 15 shown in dashed lines represents the periphery of the already coated tube at the point of the rotatable mounting of the tube. The central point A of the dashed circle designates the axis of rotation of the tube. In FIGS. 3 and 4 the central point B of the tube cross-section 1 does not lie on the axis of rotation A at the application point owing to a deflection of the tube. As a result of being guided by the elbow 5 abutting the tube, the position of the nozzle 3 relative to the central point B is maintained. Slight differences arise simply as a result of the fact that the support arm 6 does not perform a strictly vertical movement but a pivot movement about the shaft 9. However the slight differences necessitated thereby are tolerable in conventional coating processes.

Figure 5:
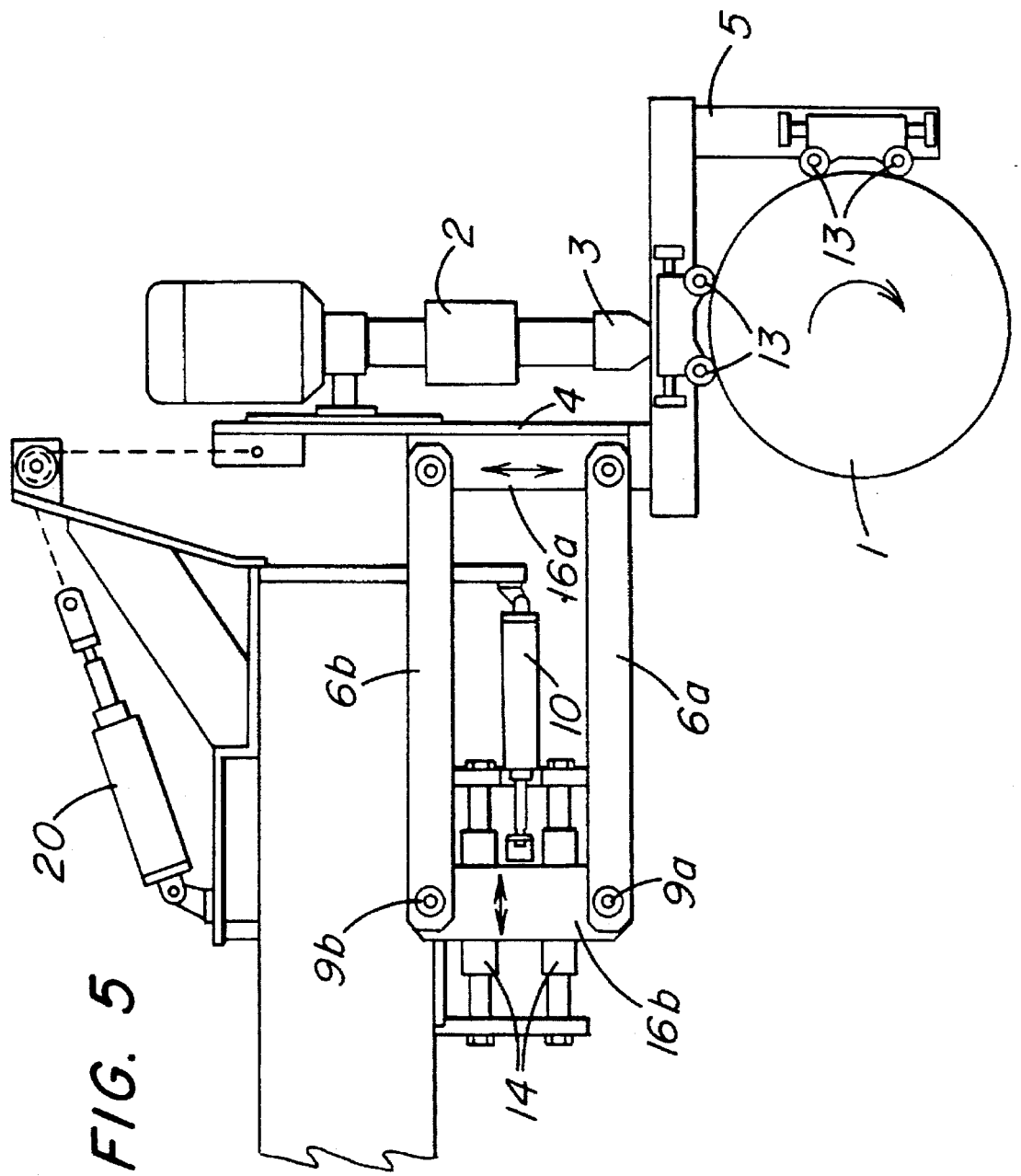
FIG. 5 shows a construction of the invention in which the support arm is in the form of a parallelogram.

In FIG. 5 the same reference numerals as in the previous Figures designate corresponding components in each case. The support arm is in the form of a parallelogram 6a, 6b, 16a, 16b. The parallelogram leg 16a is rigidly connected to the elbow 5 and is vertically movable via the pivotably (9a, 9b) mounted legs 6a and 6b.

The fourth leg 16b of the parallelogram is horizontally movable towards the pneumatic restoring device 10 by means of guide rods 14. A pneumatic weight-relieving device 20 which limits the force applied by the elbow 5 to the body of revolution 1 can further be provided.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A device for externally coating a rotating body comprising:
   a) means for mounting and rotatably driving the body to be coated;
   b) at least one coating compound application nozzle which is stationary relative to the rotational movement of said body;
   c) drive means for the relative movement of the nozzle and the body in the axial direction of the body;
   d) with the nozzle being secured to an elbow, said elbow comprising a horizontal leg and a vertical leg perpendicular thereto, and wherein said nozzle is secured to said horizontal leg;
   e) said horizontal leg being horizontally displaceable and being mounted on a vertically movable horizontal support arm, wherein the horizontal support arm is pivotably mounted on a shaft at its side which is not resting on the rotating body, so that said support arm can pivot transversely to the axis of revolution of the rotating body, and the vertical movement is brought about by the pivoting of the support arm, and wherein the horizontal displacement of said horizontal leg is caused by a restoring device; and wherein, in operation, said support arm rests on said body and said vertical leg laterally abuts said body.

2. The device of claim 1, wherein characterized in that said horizontal leg is connected to the support arm by means of a dove-tailed or ball-type guide.

3. The device of claim 1, wherein said restoring device is in the form of a hydraulic or pneumatic system having constant restoring force.

4. The device of claim 1, wherein the support arm is in the form of a parallelogram of which one vertical leg is rigidly connected to the elbow and is vertically movable and of which the other vertical leg is horizontally displaceable by means of a guide.

* * * * *